(12) United States Patent
Webber et al.

(10) Patent No.: US 7,497,466 B2
(45) Date of Patent: Mar. 3, 2009

(54) APPARATUS AND METHOD FOR PROVIDING EXTENDED INFLATOR OUTPUT

(75) Inventors: James L Webber, Shelby Township, MI (US); Shawn G Ryan, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 250 days.

(21) Appl. No.: 11/461,332

(22) Filed: Jul. 31, 2006

(65) Prior Publication Data

US 2008/0023949 A1    Jan. 31, 2008

(51) Int. Cl.
*B60R 21/26* (2006.01)
(52) U.S. Cl. ...................................... 280/737
(58) Field of Classification Search ............... 280/736, 280/737, 740, 741; 102/530, 531
See application file for complete search history.

(56) References Cited

U.S. PATENT DOCUMENTS

| | | | | |
|---|---|---|---|---|
| 5,709,406 | A * | 1/1998 | Buchanan | 280/737 |
| 5,992,881 | A * | 11/1999 | Faigle | 280/737 |
| 6,086,094 | A * | 7/2000 | Stevens et al. | 280/741 |
| 6,135,492 | A | 10/2000 | Zimmerbeutel et al. | |
| 6,168,191 | B1 | 1/2001 | Webber et al. | |
| 6,672,616 | B2 * | 1/2004 | Jonsson et al. | 280/737 |
| 6,719,016 | B1 | 4/2004 | Fink | |
| 6,834,885 | B2 * | 12/2004 | Mizuno et al. | 280/737 |
| 7,004,500 | B2 * | 2/2006 | Dinsdale et al. | 280/737 |
| 2002/0180195 | A1 * | 12/2002 | Nanmu | 280/737 |

* cited by examiner

*Primary Examiner*—John Q. Nguyen
*Assistant Examiner*—Robert A. Coker
(74) *Attorney, Agent, or Firm*—Douglas D. Fekete

(57) ABSTRACT

An inflation device for an airbag module, the inflation device comprising: a first chamber and a second chamber, the first chamber having a first volume of inflation gas and the second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a second sealing member, the second sealing member sealing the second inflation opening, the second inflation opening being substantially smaller than the first inflation opening; a conduit member for providing fluid communication with the first inflation opening and the second inflation opening; an initiator for removing a portion of the first sealing member from the first inflation opening; and a puncture device disposed within the conduit member, the puncture device being configured to remove a portion of the second sealing member when the portion of the first sealing member is removed from the first sealing opening, wherein the first volume of inflation gas glows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume.

24 Claims, 3 Drawing Sheets

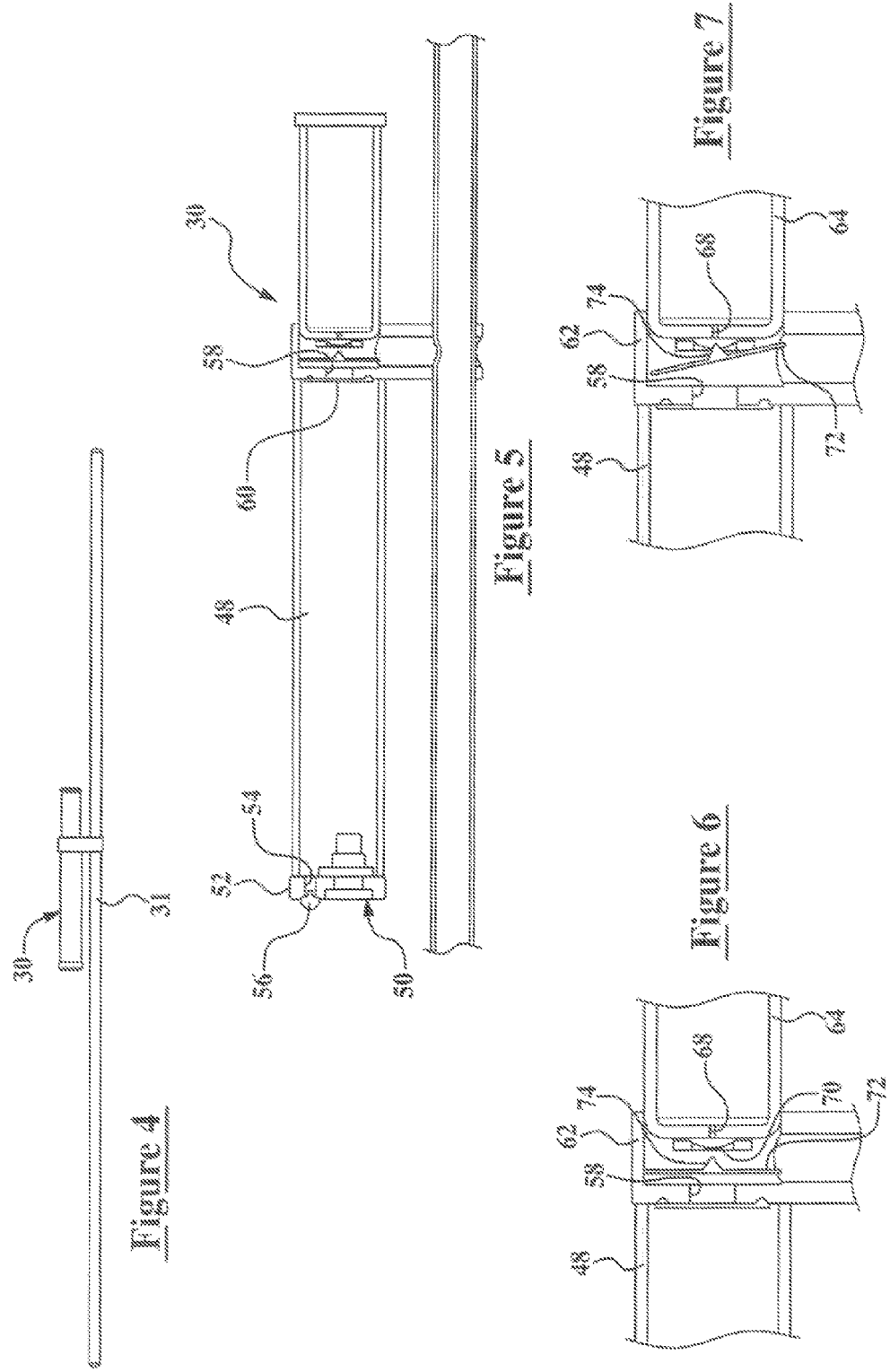

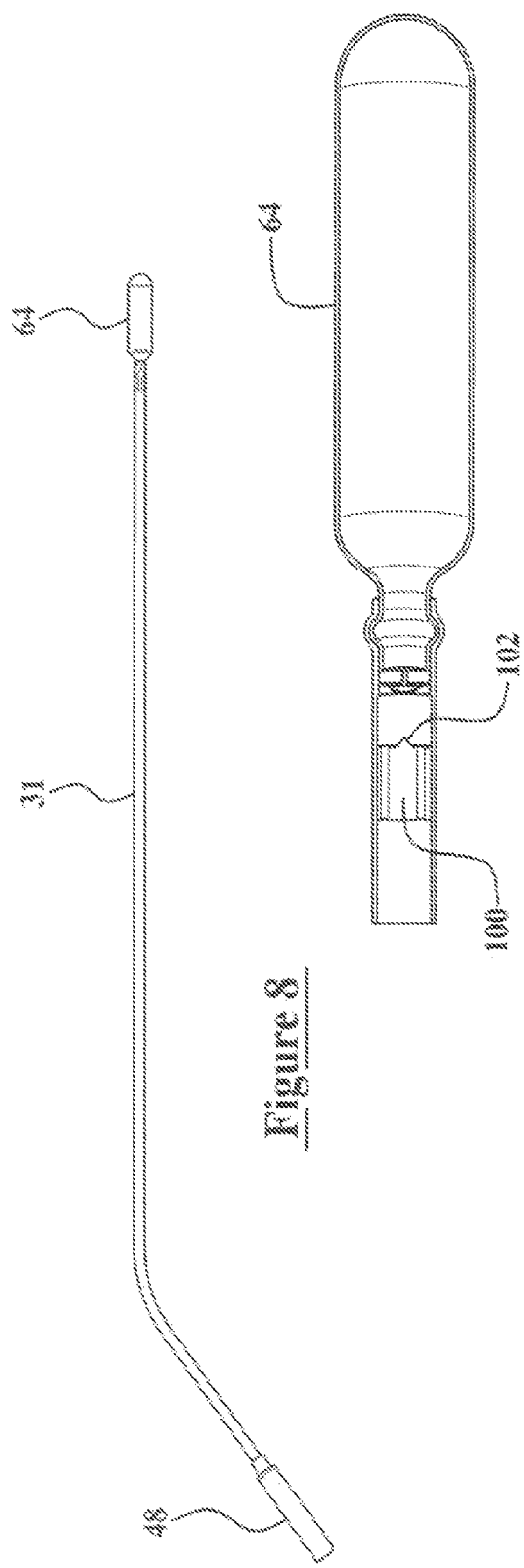
Figure 8
Figure 9
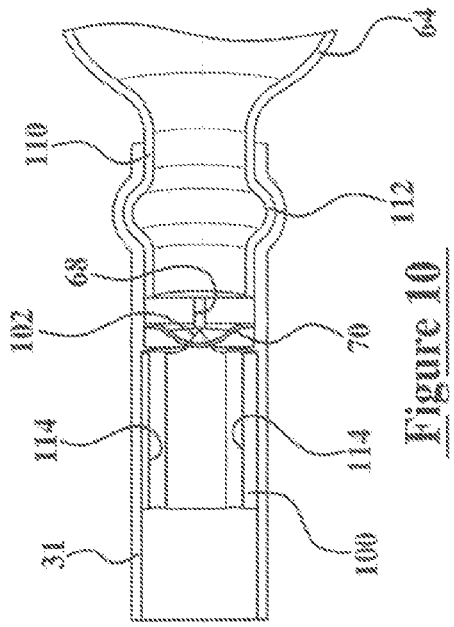
Figure 10

US 7,497,466 B2

APPARATUS AND METHOD FOR PROVIDING EXTENDED INFLATOR OUTPUT

CROSS REFERENCE TO RELATED APPLICATIONS

The present invention relates to the following applications: Extended Output Inflator Device, Ser. No. 11/461,285 and Apparatus and Method for Providing Extended Inflator Output, Ser. No. 11/461,106, filed contemporaneously herewith, the contents each of which are incorporated herein by reference thereto.

TECHNICAL FIELD

The present invention relates to airbag devices and more particularly the present invention relates to an apparatus and method for providing extended inflator output.

BACKGROUND

Today some vehicles are supplied with side airbag modules. A side airbag module comprises inflatable cushions or curtains that traverse a side portion the vehicle when they are deployed in accordance with a predetermined activation event. Generally, the device is located along a side of the vehicle in an un-inflated state and upon activation deploys an inflatable curtain along a side portion of the vehicle. Side impact air bags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

Substantial efforts have been directed to developing inflatable cushions or curtains having extended periods of inflation or in other words inflatable cushions that will retain their inflation gases for a period time after inflation. Some methods for providing this extended period of inflation is to minimize the inflation gas leakage by providing a one-piece-woven curtain airbag or by applying a sealant at the seams where the two sides of an inflatable cushion are sealed together. However, both of these methods are costly as they add additional manufacturing steps and methods.

Accordingly, it is desirable to provide an airbag module capable of providing an inflatable cushion or curtain with an extended period of inflation.

SUMMARY OF THE INVENTION

A method and apparatus for providing an extended period of inflation without incurring the additional costs of providing a specialized cushion material or sealing process and/or the costs associated with the application of an additional inflator mechanism and/or firing loop to provide the secondary inflator output is illustrated. In accordance with an exemplary embodiment, an inflator mechanism is provided wherein a first volume of gas is released into an inflatable cushion via a first inflator opening and the inflator output through the first inflator open and is used to release a second volume of gas into the inflatable cushion at a second flow rate for an extended period of time.

An inflation device for an airbag module, the inflation device comprising: a first chamber and a second chamber, the first chamber having a first volume of inflation gas and the second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a second sealing member, the second sealing member sealing the second inflation opening, the second inflation opening being substantially smaller than the first inflation opening; a conduit member for providing fluid communication with the first inflation opening and the second inflation opening; an initiator for removing a portion of the first sealing member from the first inflation opening; and a puncture device disposed within the conduit member, the puncture device being configured to remove a portion of the second sealing member when the portion of the first sealing member is removed from the first sealing opening, wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume.

An airbag module, comprising: an inflation device for inflating an inflatable cushion of the airbag module, the inflation device comprising: a first chamber and a second chamber, the first chamber having a first volume of inflation gas and the second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a second sealing member, the second sealing member sealing the second inflation opening; a diffuser tube for providing fluid communication with the first inflation opening, the second inflation opening and the inflatable cushion; an initiator for removing a portion of the first sealing member from the first inflation opening; and a puncture device moveably disposed within the diffuser tube, the puncture device further comprising a tip portion being configured to remove a portion of the second sealing member when the portion of the first sealing member is removed from the first sealing opening, wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume and wherein the first flow rate generates a force to cause the tip portion of the puncture device to remove the portion of the second sealing member.

A method of providing extended inflation output to an inflatable cushion of an airbag module, the method comprising: supplying a first volume of inflation gas from a first inflation chamber through a first inflation opening at a first flow rate; supplying a second volume of inflation gas from a second inflation chamber through a second inflation opening at a second flow rate; wherein the first flow rate will generate a force for causing a puncture device to remove a portion of a sealing member from the second inflation opening only after the first inflation opening has been opened, the puncture device being moveably received within a conduit providing fluid communication between the first volume of inflation gas and second volume of inflation gas.

BRIEF DESCRIPTION OF THE DRAWINGS

FIG. 4 is a schematic illustration of an inflator device constructed in accordance with an exemplary embodiment of the present invention;

FIG. 5 is an enlarged cross-sectional view of a portion of the inflator device illustrated in FIG. 4;

FIGS. 6 and 7 are enlarged cross-sectional views illustrating operational aspects of portions of the inflator device illustrated in FIG. 5;

FIG. 8 is a schematic illustration of an inflator device constructed in accordance with an alternative exemplary embodiment of the present invention;

FIG. 9 is an enlarged cross-sectional view of a portion of the inflator device illustrated in FIG. 8; and FIG. 10 is an enlarged cross-sectional view illustrating operational aspects of portions of the inflator device illustrated in FIGS. 8 and 9.

DETAILED DESCRIPTION OF EXEMPLARY EMBODIMENTS

This application relates to methods and apparatus for providing extended inflator output in vehicle airbag systems. More particularly, exemplary embodiments are directed to an apparatus that is configured to provide an extended inflator output for use with an inflatable cushions.

Figure 1:
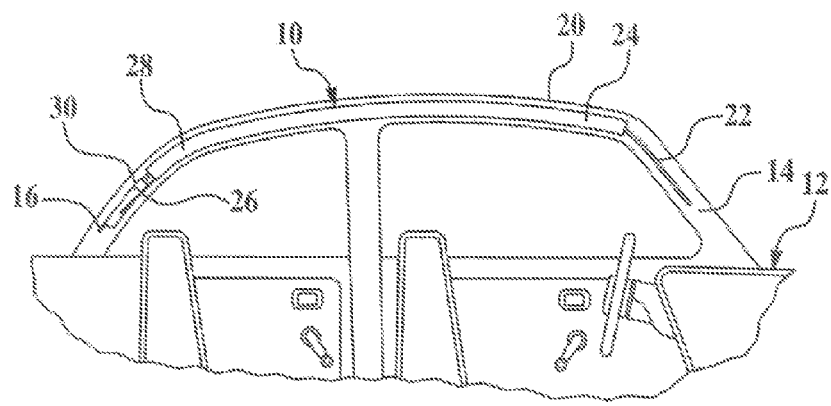
FIG. 1 is a side elevational view of an inflatable cushion in a stored position.

Referring now to FIG. 1, an inflatable cushion or airbag 10 is illustrated. Airbag 10 is manufactured and constructed in order to deploy in a variety of vehicle configurations. As discussed herein, exemplary embodiments of the present invention are related to apparatus and methods for providing extended inflator output for use with inflatable cushions. As used herein inflatable cushions are intended to refer to side curtain airbags, driver side airbags, passenger side air bags, etc. FIG. 1 provides a non-limiting example of an airbag or inflatable cushion 10 mounted to a vehicle 12 in a stored or non-deployed state. As illustrated, vehicle 12 comprises a front pillar 14, a rear pillar 16 and if the vehicle has more than one door per side, a center pillar or pillars 18 or as known to those skilled in the related arts A, B, C and D pillars. Inflatable cushion 10 is stored and mounted to or proximate to a vehicle roof rail 20 beneath a headliner. In some applications a first tether or connecting means 22 connects a front portion 24 of the inflatable cushion to the front pillar and a second tether or connecting means 26 connects a rear portion 28 of the inflatable cushion to the rear pillar.

It is, of course, understood that depending on the application requirements or configuration of the airbag device, inflatable cushion 10 may not require connecting means 22 and 26. Thus, connecting means 22 and 26 are provided as examples and the present invention is not intended to be limited by the same.

As illustrated, the rear portion of the air bag is in fluid communication with a gas generator or inflator 30 positioned to provide an inflation gas to inflate inflatable cushion 10 via a diffuser tube 31 having a plurality of diffuser openings disclosed therein. It is, of course, understood and as applications may vary, the positioning of the inflator may be located in other positions than those illustrated in the drawings. For example, the inflator may be located in a forward vehicle position. Thus, the presented location is provided as an example and the present invention is not intended to be limited by the same. In yet another alternative, the inflator may be remotely located and a conduit or other fluid providing means is used to supply the inflating gas from the inflator to the inflatable cushion.

Figure 2:
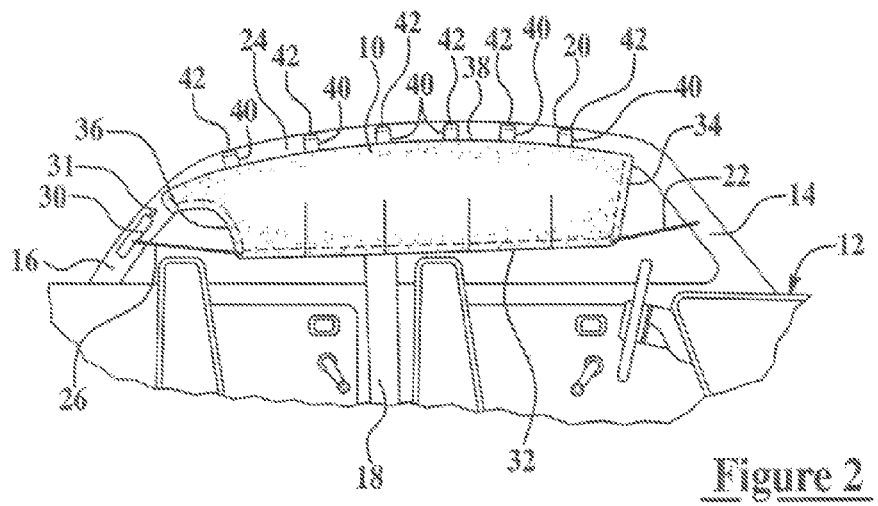
FIG. 2 is a side elevational view of an inflatable cushion in a deployed state.
Figure 3:
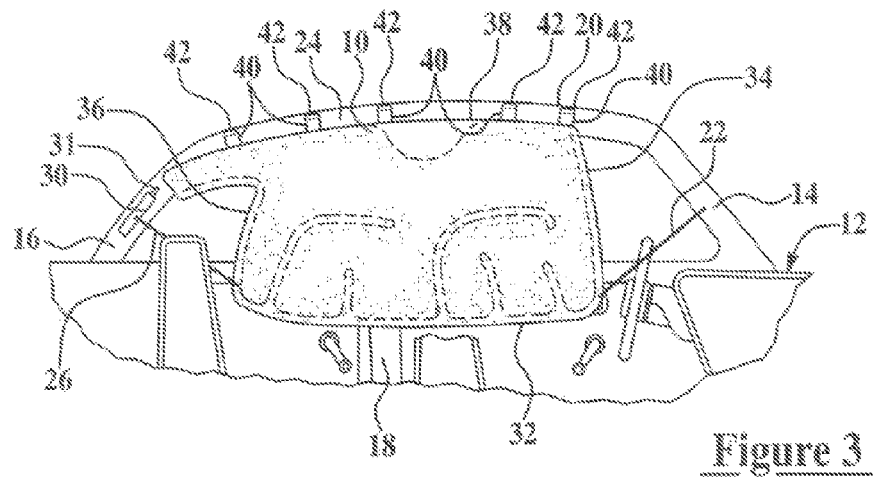
FIG. 3 is a side elevational view of another inflatable cushion in a deployed state.

FIGS. 2 and 3 illustrate inflatable cushion 10 of two different non-limiting designs in an inflated or deployed state. As illustrated in FIGS. 2 and 3, inflatable cushion 10 comprises a deploying edge 32, which comprises the bottom portion of the airbag that traverses across the window openings or window frames of the vehicle. Airbag 10 also comprises a forward edge 34, a rearward edge 36 and a fixed edge 38. Fixed edge 38 represents the portion of the airbag that remains in substantially the same position regardless of whether the airbag 10 is deployed or not.

Many different types of airbags or inflatable cushion arrangements (e.g., internal cavities, tethers or seams) are contemplated to be used with exemplary embodiments of the present invention. If is understood that the configuration of inflatable cushion 10 may vary and the illustrations in FIGS. 1 and 2 are provided as examples and the present invention is not intended to be limited to the specific configurations provided in the figures as they are considered ancillary to the present invention. Moreover, the present invention is contemplated for use with other vehicle configurations than those illustrated in FIGS. 1-2. For example, the vehicle may include three rows of seats. Such vehicles include but are not limited to sports utility vehicles, station wagons, vans or minivans. Conversely, the vehicle may comprise only a single row of seats such vehicles include but are not limited to sports coups.

The inflatable cushion may be made of any suitable air bag material for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail 24 or proximate to the roof rail as shown in FIG. 1. In order to store the airbag into the compartment the un-inflated airbag is folded into a configuration which allows it to occupy a small discrete area within the vehicle interior.

In accordance with an exemplary embodiment the fixed edge 38 comprises a plurality of mounting portions 40, which comprise a portion of the inflatable cushion and depend away from fixed edge 38. As illustrated, mounting portions 40 are each secured to an attachment apparatus 42, which in accordance with an exemplary embodiment are configured to slidably engage a feature (e.g., mounting surface, mounting aperture) of the vehicle surface that is configured to engage the attachment apparatus 42. Alternatively, fixed edge 38 may be configured to have attachment apparatus 42 secured thereto negating the need for mounting portions 40. In accordance with an exemplary embodiment, apparatus 42 is fixedly secured to the airbag via any suitable method including rivets, bolts, studs, adhesives, etc. or equivalents thereof. In one exemplary embodiment, apparatus 42 is insert molded about a portion of the inflatable cushion.

Referring now to FIGS. 4-6, an exemplary embodiment of the present invention is illustrated. Here inflator 30 comprises a first inflation chamber 48 for storing a first volume of a compressed gas for inflation of the inflatable cushion during a predetermined activation event. As illustrated, first inflation chamber 48 further comprises initiator 50 positioned at one end of the first inflation chamber. In accordance with an exemplary embodiment, initiator 50 is received within an end plate 52 secured to an end of the first inflation chamber. End plate 52 is further configured to have a fill passageway 54 and a sealing means 56 secured therein after a predetermined volume of inflation gas is supplied to first inflation chamber 48. In accordance with an exemplary embodiment fill passageway 54 may be closed or plugged in any fashion that allows the first inflation chamber to be filled with a first compressed volume of inflation gas and sealed.

Inflation chamber 48 further comprises an inflation output opening 58, which is positioned to release the inflation gas stored in inflation chamber 48 upon activation of initiator 50. Disposed over inflation output opening 58 is a burst disk or first closure member 60, which is configured to open or fail upon activation of initiator 50, which in accordance with known technologies will increase the temperature and pressure of the gas stored in inflation chamber 48.

As is known in the related arts, initiator 50 is electrically coupled to a sensing in diagnostic module configured to receive and interpret signals from a plurality of sensors disposed within the vehicle in order to determine whether an activation signal is to be sent to initiator 50. Upon receipt of the activation signal initiator 50 will fire a small pyrotechnic charge in order to increase the temperature and pressure on a gas stored within inflation chamber 48. A non-limiting example of a gas stored in inflation chamber 48 is argon, helium, carbon dioxide, nitrogen and equivalents and mixtures thereof.

In accordance with an exemplary embodiment and as illustrated in FIGS. 5 and 6, inflation output opening 58 comprises a portion of or is in fluid communication with an output conduit 62 configured to provide fluid communication between diffuser 31 and inflation output opening 58. In addition, output conduit 62 is configured to be in selective fluid communication with a second inflation chamber 64. As illustrated, second inflation chamber 64 comprises a substantially smaller volume for holding a second amount of inflation gas, which is to be provided into output conduit 62 via an output orifice 68. In accordance with an exemplary embodiment, output orifice 68 is sealed via a burst disk or second closure member 70 disposed in a facing space relationship with respect to a movable puncture plate 72. In accordance with an exemplary embodiment, movable puncture plate 72 is fixedly secured to an inner surface of the output conduit 68 at one end while being freely supported at another end. Non-limiting examples of methods for securing the puncture plate to the inner surface of the output conduit includes friction fit, snap-in of a portion of the puncture plate into an annular groove or lengthwise slot in the conduit, welding, cold press, interference fit, adhesives, combinations and equivalents thereof. Non-limiting examples of materials for puncture plate 72 include metals, alloys, plastics, combinations thereof and equivalents thereof, each of which has a resilient and/or a deformable characteristic allowing puncture plate 72 to move from a non-activated position to an activated position.

In yet another embodiment, puncture plate 72 is releasably secured by one of the aforementioned releasable securement methods and upon release of the inflation gas from the first inflation chamber the entire plate is released due to the force of the inflation gases from the first inflation chamber and the plate is moved towards the burst disk covering the output opening of the second inflation chamber. In other words, the entire puncture plate moves laterally as opposed to only a portion moving and a portion remaining secured.

In accordance with an exemplary embodiment, movable puncture plate 72 comprises a protrusion, tip or point 74 configured to rupture burst disk 70 when movable puncture plate 72 is manipulated from a non-activation position (illustrated in FIG. 6) to an activated position illustrated in FIG. 7 wherein the release of the inflation gas from first inflation chamber 48 through inflation output opening 58 causes puncture plate 72 to move from the non-activated position to the activated position thus allowing the inflation gases of the second inflation chamber to be released into output conduit 62. Tip or point 74 is constructed out of a material that is harder than burst disk 70 (e.g., stainless steel or hardened metal) in order to ensure opening of the burst disk, non-limiting examples of burst disk materials include thin stainless steel or Inconnel.

As illustrated, inflator output opening 58 is substantially larger than output conduit 68 thus, the inflation output from a second inflation chamber 64 is at a substantially lower flow rate for an extended period of time, wherein the extended period of time is substantially longer than the period of time for the inflation gases to flow out of the first chamber. Accordingly and in accordance with an exemplary embodiment of the present invention, the first inflation chamber is used to provide an initial output for initially deploying and inflating the inflatable cushion, while the second inflation chamber is used to provide a secondary or supplemental inflation output during and after the initial inflation of the inflatable cushion. In accordance with an exemplary embodiment of the present invention, the output of the second inflation chamber is configured to counteract the leakage of the inflation gases from the inflatable cushion during initial deployment period. In other words, and in order to provide an extended period of inflation of the inflatable cushion, the first inflation chamber is used to provide an initial inflation output in order to deploy the inflatable cushion into a desired inflated configuration thereafter, any leakage of the inflation gases used to inflate the inflatable cushion are counteracted by the supplemental inflation output of the second inflation chamber as the smaller orifice of the second inflation chamber allows the supplemental inflation to be provided over a longer time period than those typically encountered for release of all the gases in a single stage inflator.

Moreover, and through the use of a movable puncture plate disposed in an output path of the first inflation chamber, the rupture of the burst disk or the release of the inflation gases stored in the second inflation chamber is achieved without requiring a secondary firing loop comprising additional logic and another initiator, which will increase the overall costs of the airbag module. In accordance with an exemplary embodiment, the output gases of the first inflation chamber are used to move the puncture plate from a non-activated position to an activated position wherein the burst disk of the second inflation chamber is ruptured and the gases of the second inflation chamber are allowed to trickle out at a substantially lower flow rate during the activation of the airbag module. In accordance with an exemplary embodiment, and if necessary the inflation forces from the second inflation chamber will move the puncture plate towards the non-activated position to allow the inflation gases to be released from the second inflation chamber.

In an alternative exemplary embodiment, puncture plate 72 is configured to substantially cover output conduit 68 when the puncture plate is in its activated position and the flow rate of the first inflation gas is large enough to maintain puncture plate 72 in the activated configuration illustrated in FIG. 7 as well as overcome the counteracting flow rate through output conduit 68. Thereafter, and as the flow rate through opening 58 decreases the force up the gases exiting through output conduit 68 will force puncture plate 72 back towards the non-activated position thereby releasing the inflation gases of second chamber 64.

Referring now to FIGS. 8-10, another alternative exemplary embodiment of the present invention is illustrated. Here first inflation chamber 48 is disposed at one end of diffuser tube 31 while second inflation chamber 64 is disposed at another end of diffuser tube 31. In this embodiment, movable puncture plate 72 is replaced by a projectile 100 slidably received within diffuser tube 31. As in the previous embodiment, the inflation output of first inflation chamber 48 is used to slide projectile 100 from a non-activated position (FIG. 9) to an activated position (FIG. 10) wherein a protrusion, tip or puncture feature 102 is used to rupture burst disk 70 disposed over output conduit 68 of the second inflation chamber 64. In one embodiment, the projectile is releasably secured to the diffuser tube. Non-limiting examples of fixing of the projectile initially in the conduit include friction fit, snap-in of a portion of the projectile into an annular groove or lengthwise slot in the conduit, interference fit, weak adhesives, combinations and equivalents thereof. In another embodiment, a shear feature of metal or plastic is inserted into or through an opening or channel in the diffuser tube wall, additionally or alternatively it could also be held in place with a small bit of weak adhesive. Accordingly, and after the gas is released from the first inflation chamber, the projectile will be released and slide towards burst disk 70 disposed over output conduit 68. In yet another alternative the projectile may just be slidably received within the diffuser tube.

As illustrated in FIGS. 9 and 10, second inflation chamber 64 is configured to have a portion 110 comprising a ridge or ring of material 112 configured to provide a sealing means wherein a portion of diffuser tube 31 is secured thereto.

In addition, and in order to provide fluid communication from an internal chamber of second inflation chamber 64 through outlet opening 68 into the inflatable cushion (not shown), fluid conduits 114 are disposed within projectile 100. Fluid conduits 114 will provide a passageway for the inflation gases stored in second inflation chamber 64 to ultimately pass into the inflatable cushion.

While the invention has been described above making specific reference to embodiments wherein the first chamber, the diffuser chamber and the second chamber, are longitudinally aligned, the broader practice of the invention is not necessarily so limited.

It is also understood that the configuration of the inflatable cushions may vary and the illustrations of the cushion in the Figures are provided as examples and the present invention is not intended to be limited to the specific configurations provided in the figures, as they are considered ancillary to the present invention.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coups. Therefore, the above-described airbag module may be easily modified to accommodate all types of vehicles in several different types of configurations.

Furthermore, prior to deployment, the inflatable cushion may be stored in a compartment mounted to the roof rail or proximate to the roof rail. In order to store the airbag into the compartment the un-inflated cushions are folded into configurations, which allow it to occupy small discrete areas within the vehicle interior.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

Accordingly, exemplary embodiment of the present invention provide a method and apparatus for providing an extended period of inflation without incurring the additional costs of providing a specialized cushion material or sealing process and/or the costs associated with the application of an additional inflator mechanism and/or firing loop to provide the secondary inflator output is illustrated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflation device for an airbag module, the inflation device comprising:
    a first chamber and a second chamber, the first chamber having a first volume of inflation gas and the second chamber having a second volume of inflation gas;
    a first inflation opening for allowing the first volume of inflation gas to pass therethrough and a first sealing member, the first sealing member sealing the first inflation opening;
    a second inflation opening for allowing the second volume of inflation gas to pass therethrough and a second sealing member, the second sealing member sealing the second inflation opening, the second inflation opening being substantially smaller than the first inflation opening;
    a conduit member for providing fluid communication with the first inflation opening and the second inflation opening;
    an initiator for removing a portion of the first sealing member from the first inflation opening; and
    a puncture device disposed within the conduit member, the puncture device being configured to remove a portion of the second sealing member when the portion of the first sealing member is removed from the first sealing opening, wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume.

2. The inflation device as in claim 1, wherein the first volume of inflation gas comprises helium and the second volume of inflation gas comprises argon.

3. The inflation device as in claim 1, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

4. The inflation device as in claim 1, wherein the puncture device is a planar member disposed in a facing space relationship with respect to the first inflation opening, the planar member having a tip portion positioned in a facing space relationship with respect to the second sealing member and the planar member being moveably secured within the conduit member such that the first flow rate will cause the tip portion to rupture the second sealing member.

5. The inflation device as in claim 4, wherein the planar member is fixedly secured to an inner surface of the conduit member at one end.

6. The inflation device as in claim 5, further, comprising a diffuser tube in fluid communication with the conduit member, the diffuser tube being configured to provide the first volume of inflation gas and the second volume of inflation gas to an inflatable cushion.

7. The inflation device as in claim 1, wherein the first chamber is laterally disposed from the second chamber.

8. The inflation device as in claim 1 wherein the puncture device is a projectile slidably received within the conduit member, wherein the projectile further comprises a tip portion positioned in a facing space relationship with respect to the second sealing member, wherein the first flow rate will cause the tip portion to rupture the second sealing member.

9. The inflation device as in claim 8, wherein the projectile further comprises a fluid passageway disposed therein, the fluid passageway providing fluid communication between conduit member and the second chamber.

10. An airbag module, comprising:
an inflation device for inflating an inflatable cushion of the airbag module, the inflation device comprising:
a first chamber and a second chamber, the first chamber having a first volume of inflation gas and the second chamber having a second volume of inflation gas;
a first inflation opening for allowing the first volume of inflation gas to Pass therethrough and a first sealing member, the first sealing member sealing the first inflation opening;
a second inflation opening for allowing the second volume of inflation gas to pass therethrough and a second sealing member, the second sealing member sealing the second inflation opening;
a diffuser tube for providing fluid communication with the first inflation opening, the second inflation opening and the inflatable cushion;
an initiator for removing a portion of the first sealing member from the first inflation opening; and
a puncture device moveably disposed within the diffuser tube, the puncture device further comprising a tip portion being configured to remove a portion of the second sealing member when the portion of the first sealing member is removed from the first sealing opening, wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume and wherein the first flow rate generates a force to cause the tip portion of the puncture device to remove the portion of the second sealing member.

11. The airbag module as in claim 10, wherein the first volume of inflation gas comprises helium and the second volume of inflation gas comprises argon.

12. The airbag module as in claim 10, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

13. The airbag module as in claim 10, wherein the puncture device is a planar member disposed in a facing space relationship with respect to the first inflation opening.

14. The airbag module as in claim 13, wherein the planner member is fixedly secured to an inner surface of the diffuser tube at one end.

15. The airbag module as in claim 10, wherein the first chamber is laterally disposed from the second chamber.

16. The airbag module as in claim 10, wherein the puncture device is a projectile slidably received within the conduit member.

17. The airbag module as in claim 16, wherein the projectile further comprises a fluid passageway disposed therein, the fluid passageway providing fluid communication between diffuser tube and the second chamber.

18. The airbag module as in claim 17, wherein the airbag module is a side airbag module.

19. A method of providing extended inflation output to an inflatable cushion of an airbag module, the method comprising:
supplying a first volume of inflation gas from a first inflation chamber through a first inflation opening at a first flow rate;
supplying a second volume of inflation gas from a second inflation chamber through a second inflation opening at a second flow rate;
wherein the first flow rate will generate a force for causing a puncture device to remove a portion of a scaling member from the second inflation opening only after the first inflation opening has been opened, the puncture device being moveably received within a conduit providing fluid communication between the first volume of inflation gas and second volume of inflation gas.

20. The method as in claim 19, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

21. The method as in claim 19, wherein the puncture device is a planar member disposed in a facing space relationship with respect to the first inflation opening and the planar member further comprises a tip portion disposed in a facing space relationship with respect to the second inflation opening.

22. The method as in claim 21, wherein the planar member is fixedly secured to an inner surface of the conduit at one end.

23. The method as in claim 19, wherein the puncture device is a projectile slidably received within the conduit.

24. The method as in claim 23, wherein the projectile further comprises a fluid passageway disposed therein, the fluid passageway providing fluid communication between conduit and the second chamber and the airbag module is a side airbag module.

* * * * *